Dec. 10, 1940.    I. L. HAADEM    2,224,648
SOUND DEADENING SUPPORTING ELEMENT FOR FASTENING MACHINE MEMBERS
Filed Sept. 30, 1938
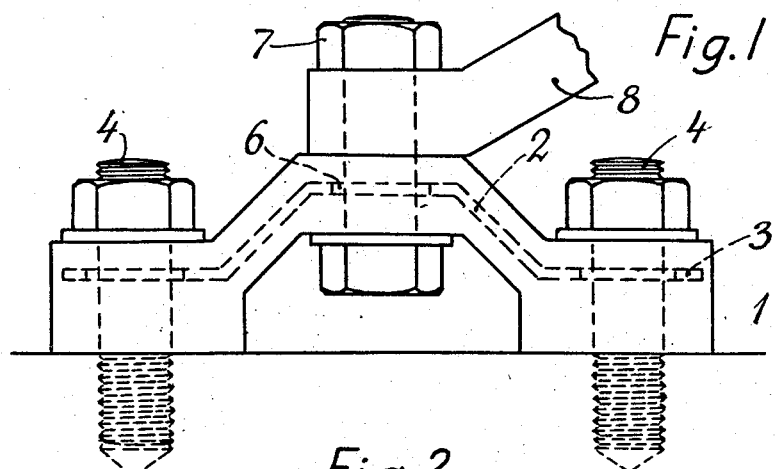
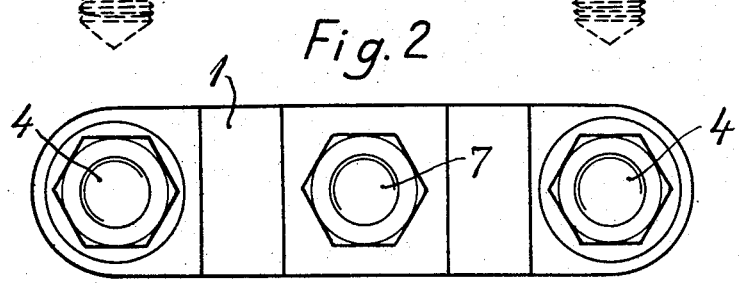
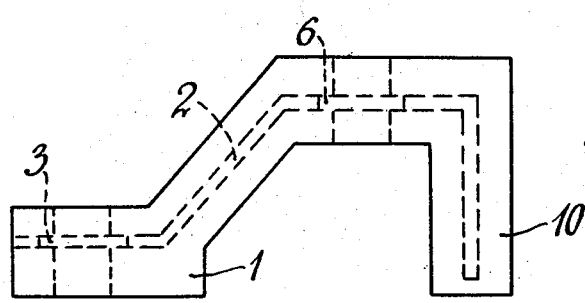
Inventor,
Ivar L. Haadem,
By Sommers & Young
Attys.

Patented Dec. 10, 1940

2,224,648

UNITED STATES PATENT OFFICE 2,224,648

SOUND DEADENING SUPPORTING ELEMENT FOR FASTENING MACHINE MEMBERS

Ivar Löken Haadem, Ostre Aker, near Oslo, Norway

Application September 30, 1938, Serial No. 232,675
In Norway October 8, 1937

2 Claims. (Cl. 248—21)

This invention has for its object to provide a supporting element of sound deadening material for fastening machine members to foundations. It appears that hard parts and particularly metal has a high capacity for propagating sound and therefore it is always tried to avoid direct contact between metal parts during erection, when the question of deadening sound is involved.

In the sound deadening supporting element according to this invention a metal reinforcement is arranged in such a manner that the latter is prevented from being displaced in relation to the sound deadening material of the element and from entering into contact either with the attaching bolts of the machine member or with the sound deadening element or with both. By such an arrangement it is possible to construct a supporting element as a finished article for use in erection of machine members or machines, because such elements may then be made in standard size, so that it is possible in each particular case to choose the size which is suitable.

According to the invention the portion of the element which constitutes a support for the fastening bolt or bolts of the machine member is so arranged as to be freely located, and the fastening part of the element is preferably arranged at a higher level than the portion of same which may be fastened to the foundation. A suitable embodiment is obtained by bending the middle portion of the element upwardly to form a bridge in relation to its end portions.

The invention is illustrated by way of example by several embodiments shown in the drawing. Fig. 1 shows an elevation of a preferred embodiment of a supporting element, Fig. 2 shows a corresponding plan view. Fig. 3 shows a modified embodiment of the element itself.

In the construction according to Fig. 1 the supporting element is preferably made of rubber or of another elastic or plastic material which is sound deadening. In the rubber a metal reinforcement 2 is embedded, preferably in the form of a metal ribbon, in such a manner that it is located permanently fixed inside the material 1 proper and therefore is not able to be displaced to any direction. This metal ribbon is provided with holes 3 for fastening bolts 4 in the foundation 5 and is also provided with holes 6 for bolts 7 which serve to fasten the machine member 8 to the supporting element. The holes 3 and 6 are made with such large diameters that there is sufficient distance between the hole edges and the fastening bolts 4 and 7 in question, so that no metallic contact will occur at these places and therefore also no complete metallic contact between the machine member 8 and the foundation 5 will exist. Of course it is not quite necessary that both the holes 3 and the holes 6 shall be without any metallic contact with their bolts. In fact it is sufficient if only at one of these places there is no metallic contact, but the best result as regard sound deadening is obtained when no metallic contact is present at any of these places.

As shown in Fig. 1 the supporting element proper is made with two end portions or feet which are connected by a bridgelike intermediate portion, and the latter is arranged at a somewhat higher level than the two end portions or feet. The purpose of this is to prevent the fastening bolt 7 from entering into contact with the foundation 5, by lifting it to a sufficient degree above the same in order not only to prevent such contact, but also to enable an easy insertion and removal of the bolt 7.

Besides, the supporting element is made in such a manner that it is strong enough in itself to sustain the strains which arise owing to weight, vibrations or other movements or loads of the machine member 8. The supporting element may also be made as shown in Fig. 3, with only one bolt hole for the foundation bolt 4 and with a bolt hole for the fastening bolt 7 of the machine member, while instead of a second foundation bolt hole a downwardly directed portion 10 is arranged which is also reinforced and serves to support a portion of the load from the machine member. Furthermore, the construction may be altered in many different manners without departing from the principle of the invention.

I claim:

1. A sound and vibration deadening element for supporting and fastening machine elements to a foundation, comprising an arched body made of non-metallic, resilient sound and vibration deadening material and provided with a bolt hole for receiving a bolt for fastening the machine member and with a bolt hole for receiving a bolt for fastening the element to the foundation, said bolt holes being parallel to each other, and a similarly arched flexible metal reinforcement extending throughout the said body in a general direction substantially perpendicular to the direction of the bolt holes and embedded in the body material so as to be fixed against displacement therein and said reinforcement having bolt holes coaxial with and larger than the bolt holes of the flexible material so that the bolts cannot contact with said metal reinforcement, said bolt holes of said reinforcement being spaced apart and the portion of the reinforcement extending therebetween being free to flex under the influence of variation of the forces.

2. A sound and vibration deadening element for supporting and fastening machine parts on a foundation, comprising an arched body made of non-metallic, resilient sound and vibration deadening material and having a middle portion provided with a bolt hole extending entirely therethrough for accommodating a bolt for fastening the machine to the element and provided with end portions located at a lower level than the middle portion and provided with holes extending entirely therethrough parallel to the first-mentioned hole and accommodating bolts for fastening the element to the foundation, and a similarly arched, flexible metal reinforcement extending throughout the said body in a general direction substantially perpendicular to the direction of the bolt holes and embedded in the body material so that it cannot be displaced therein, said reinforcement having bolt holes coaxial with and larger than the first-mentioned bolt holes so that the bolts cannot contact with said metal reinforcement, the bolt holes of said reinforcement being spaced apart and the portion of the reinforcement extending therebetween being free to flex under the influence of variation of the forces.

IVAR LÖKEN HAADEM.